United States Patent [19]

Blatt

[11] Patent Number: 4,620,696

[45] **Date of Patent: * Nov. 4, 1986**

[54] POWER CLAMP

[76] Inventor: Leland F. Blatt, P.O. Box 220, Fraser, Mich. 48026

[ * ] Notice: The portion of the term of this patent subsequent to Jan. 29, 2002 has been disclaimed.

[21] Appl. No.: 521,696

[22] Filed: Aug. 10, 1983

[51] Int. Cl.[4] .......... B23Q 3/08

[52] U.S. Cl. .......... 269/32; 74/526; 269/27; 269/35; 269/135

[58] Field of Search .......... 269/27, 91, 93, 94, 269/31, 32, 35, 135, 239; 74/526

[56] References Cited

U.S. PATENT DOCUMENTS

| | | | |
|---|---|---|---|
| 4,021,027 | 5/1977 | Blatt | 269/32 |
| 4,265,132 | 5/1981 | Robertson | 74/526 |
| 4,396,183 | 8/1983 | Lymburner | 269/32 |

*Primary Examiner*—Frederick R. Schmidt
*Assistant Examiner*—Judy J. Hartman
*Attorney, Agent, or Firm*—Cullen, Sloman, Cantor, Grauer, Scott, & Rutherford

[57] ABSTRACT

A power operated clamp includes a cylinder having a reciprocal piston rod. A hollow clamp body having side plates is aligned with and connected to the cylinder. A clamp arm is pivotally mounted upon the body and in one position is adapted to retainingly engage a workpiece relative to a workpiece support. A linkage is pivotally connected to the clamp arm; the improvement which comprises a series of vertically spaced pairs of longitudinally spaced transverse mount holes extending through the side plates. The mounting of the body includes an upright riser extending between the side plates and has a series of longitudinal similarly spaced apertures corresponding to some of the side plate apertures. Pivot bolts extend through some of the mount holes and riser, whereby the body may be mounted selectively in one of a plurality of longitudinal locations above or below the riser. A rod end is guidably mounted within the body and axially connected to the piston rod. A pivot slide pin supportably extends transversely through the rod end and at its ends is slidably mounted within side plate slots. The linkage includes a pair of links interconnecting the rod end and clamp arm. An eccentric pre-stop spans, is rotatively adjustable and secured to the side plates and is spaced from the clamp arm adapted for retaining engagement with the clamp arm when moved to workpiece retaining position.

6 Claims, 3 Drawing Figures

POWER CLAMP

BACKGROUND OF THE INVENTION

Heretofore power operated clamps include a body having a pair of side plates between which is slidably mounted a rod end connected to the reciprocal piston rod of a cylinder aligned with and attached to the body. Said clamp includes a linkage interconnecting the reciprocal rod end with a clamp arm pivotally mounted upon the body and in one position adapted for securing a workpiece relative to a workpiece support.

THE PRIOR ART

Clamps of this type are shown in Applicant's U.S. Pat. No. 3,702,185 dated Nov. 7, 1972 entitled Cylinder Operated Power Clamp and U.S. Pat. No. 4,021,027 dated May 3, 1977 entitled Power Wedge Clamp with Guided Arm.

RELATED APPLICATION

| SERIAL NUMBER | FILING DATE | TITLE |
|---|---|---|
| 362,512 | March 26, 1982 | Power Operated Clamp |

SUMMARY OF THE INVENTION

It is an important feature of the present invention to provide an improvement for a fluid power clamp of this type wherein the side plates have formed therein a series of vertically spaced pairs of longitudinally spaced mounting holes which extend through the side plates adjacent their tops and bottoms. The body may be longitudinally and adjustably mounted with respect to a riser by selectively extending a series of pivot bolts through some of the spaced mounting holes in the side plates and through corresponding apertures within a riser projected down or up into the body between the side plates. This provides versatility of position of mounting of the clamp.

A further feature includes a rod end slidably mounted between the side plates and connected a reciprocal piston rod. A linkage interconnects the rod end and a pivotal clamp arm. An eccentrically mounted prestop is adjustably mounted between the body side plates and secured thereto. Said pre-stop is aligned with the clamp arm and adapted for retaining engagement with the clamp arm when it is moved to a workpiece retaining position. The eccentric pre-stop may be adjusted to eliminate any variations of the clamp arm position due to a loose linkage. The eccentric pre-stop may also be rotatively adjusted to take up any wear in order to maintain the clamp arm in a stationary, non-shake position when in engagement with the workpiece.

A further feature includes an improved clamp arm assembly and linkage which interconnects the clamp arm with the body and with the reciprocal rod end in such manner as to accomplish a controlled pivotal movement of the clamp arm relative to the body and with respect to a workpiece.

As a further feature, the side plates extend downwardly below the row of the bottom mount holes on the body of the clamp to provide for increased supporting surface engagement with respect to portions of the clamp arm to increase the guide and stability of the clamp arm when in its clamped position due to its increased surface engagement with the enclosing side plates.

These and other objects and features will be seen from the following Specification and claims in conjunction with the appended drawings.

THE DRAWINGS

It will be understood that the above drawings illustrate merely a preferred embodiment of the invention, for illustration, and that other embodiments are contemplated within the scope of the claims hereafter set forth.

DETAILED DESCRIPTION OF AN EMBODIMENT OF THE INVENTION

Figure 1:
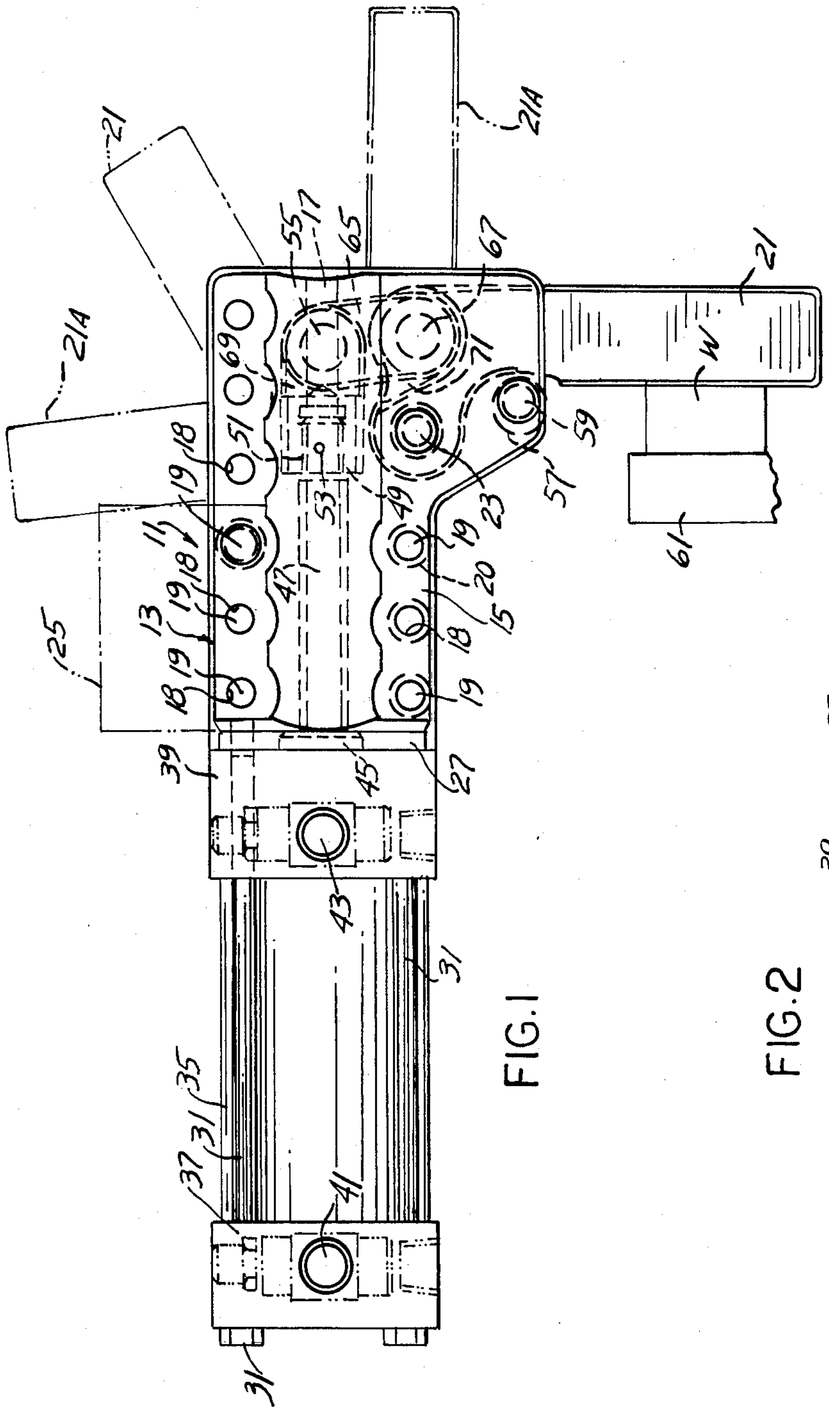
FIG. 1 is a side elevational view of the power clamp with the clamp arm in a workpiece retaining position and with its retracted position shown in dash lines.
Figure 2:
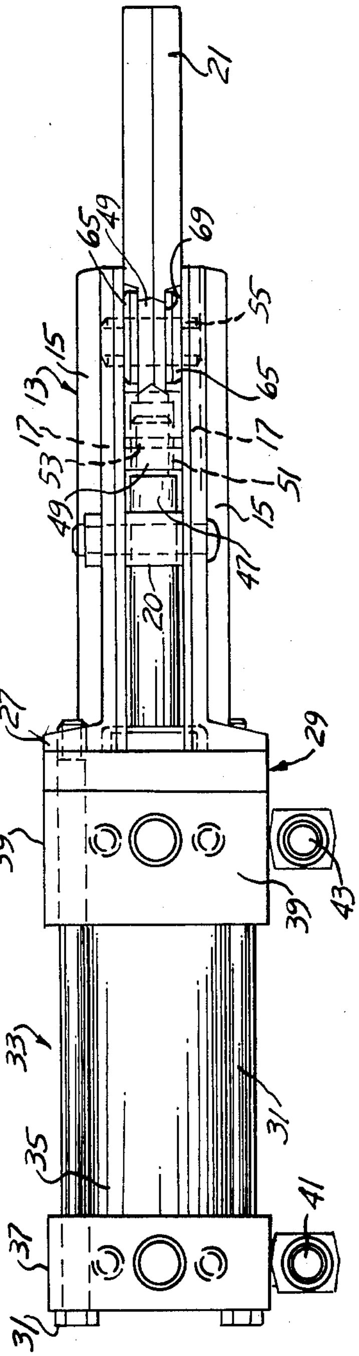
FIG. 2 is a plan view thereof.
Figure 3:
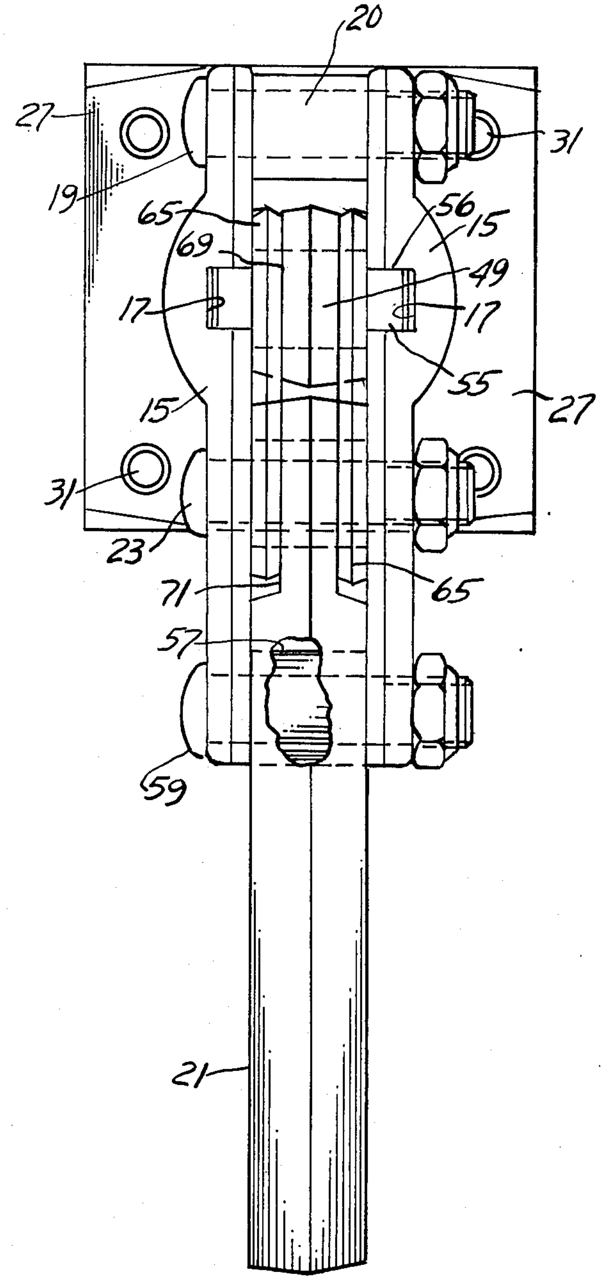
FIG. 3 is an end view thereof, on an increased scale.

Referring to the drawings, FIGS. 1, 2 and 3 the present power clamp is generally indicated at 11, having a body 13 which includes a pair of opposed parallel spaced side plates 15 which have upon their interior a pair of opposed elongated slots 17, FIG. 2.

Formed within the side plates adjacent their top and bottom are a series of vertically spaced pairs of longitudinally spaced transverse mounting holes 18 which extend through the side plates and are adapted to receive transverse pivot bolts 19 which extend through the side plates and through corresponding mount holes and a plurality of body spacers 20, FIGS. 2 and 3.

Clamp arm 21, which is right angular in form, but which could be straight 21A, is at one end pivotally mounted upon the body by the transverse pivot bolt 23 which extends through corresponding apertures 18 within the side plates.

The body is supported by riser block 25 shown in dash lines, arranged above the body having a series of longitudinally spaced apertures corresponding to the mounting holes 18 within the side plates. Said riser is selectively positioned between the side plates in one of several longitudinal positions and secured thereto by the transverse pivot bolts 19.

In the present improved clamp body 13 there is provided a plurality of mounting apertures 18 instead of a single mounting as shown at 25 in Applicant's U.S. Pat. No. 4,021,027. This adds to the versatility of the mounting, since the clamp base riser 25 may be mounted not only in a forward position, but also in steps of equal increments. Since normally three holes are used for mounting, this would allow five locations for the nine equally spaced mounting holes.

The side plates 15 at their one ends terminate in the outturned mount flanges 27, FIG. 2 which are apertured. These flanges bear against the spacer 29, FIG. 2. They are axially mounted upon the end of the cylinder assembly 33, FIG. 1, and secured thereby by the cylinder assembly bolts 31.

The cylinder assembly includes cylinder 35, an air cylinder, including blind end head 37 and rod end head 39 with corresponding ports 41 and 43 adapted to selectively and alternatively receive pressure fluid such as compressed air for effecting reciprocation of a piston within said cylinder, and the piston rod 47 axially connected thereto. Said cylinder may be hydraulic.

Said piston rod extends outwardly of the cylinder through head 39 and the gland 45 and extends into the clamp body 13 between the side plates 15. Said rod is axially connected to the rod end 49 as by the threading at 51 and by the transverse pin 53. Accordingly, the rod end is adapted for reciprocal movements within the body 13 upon which it is guidably mounted. Pivot slide pin 55 extends transversely through rod end 49 with its outer ends slidably positioned and movably mounted within the side wall interior slots 17, FIGS. 1 and 2.

Eccentric pre-stop 57, cylindrical in form, is interposed between side plates 15 and adjustably secured by the pivot bolt 59 which extends between said side plates. Pre-stop 57 is aligned with clamp arm 21 rearwardly thereof and in the clamping position of the clamp arm 21, FIG. 1, with respect to the workpiece W and workpiece support 75, the clamp arm 21 is in cooperative registry with the eccentric pre-stop 57 for limiting pivotal clamping movements of arm 21.

Should a workpiece W be of a different dimension, the eccentric pre-stop 57 may be rotatively adjusted to the correct location on loosening pivot bolt 59 so as to cooperatively receive the clamp arm 21 when in workpiece clamping position. Pivot bolt 59 may be then tightened to maintain the eccentric position of the pre-stop. Thus the eccentric pre-stop may be rotatively adjusted to eliminate any variation in the arm position due to a loose linkage mechanism. The eccentric pre-stop is adapted to be adjustable in order to take up any wear to maintain pivot arm 21 or pivot arm 21A in a stationary, non-shake position as it is forcefully moved into operative retaining engagement with workpiece W upon the support 61, FIG. 1.

A linkage is illustrated in the drawings including a pair of links 65 at their one end pivotally conntected by pivot pin 67 to the clamp arm 21 intermediate its ends and spaced from pivot bolt 23. The other ends of said links are pivotally connected to the pivot slide pin 55, which further functions to slidably support rod end 49. Said pivot pin at its ends is flat on top and bottom at 56.

Reciprocal movements of rod end 49 under the control of the cylinder assembly and piston rod 47 functioning through the linkage 65 is adapted to move the clamp arm 21 from the dash line retracted position shown in FIG. 1 to the solid line workpiece securing position.

As shown between FIGS. 1, 2 and 3, a forward portion of rod end 49 is flattened and includes a pair of opposed surfaces 69. Similarly an intermediate portion of clamp arm 21 has flattened sides 71 of reduced thickness Accordingly, the respective links 65 bear against the flattened surfaces 69 and 71 and are generally arranged within the contour respectively of the rod end 49 and said clamp arm. Exterior surface portions of the links 65 are in cooperative guided engagement with interior surface portions of side plates 15 of the clamp body. As shown in FIGS. 1 and 2, the piston rod 47 is substantially elongated and extends longitudinally substantially the length of the body 13 and at its end is secured to the rod end 49. The transverse slide pin 55 stabilizes the rod end and constrains the rod end to longitudinal reciprocal movements with respect to the clamp body.

Having described my invention, reference should now be had to the following claims:

I claim:

1. In a power operated clamp for securing a workpiece relative to a workpiece support, including a cylinder having a reciprocal piston and connected piston rod projecting from said cylinder; a hollow clamp body axially aligned with and connected to said cylinder and mounted upon a first support; said body being open at its top, bottom and front and including a pair of opposed spaced side plates with their one ends outturned and secured to said cylinder; said piston rod extending into said body between said side plates; a pivot bolt extending between forward portions of said side plates and secured thereto; a clamp arm at one end pivotally mounted upon said pivot bolt and in one position adapted to retainingly engage a workpiece relative to said workpiece support; and a pair of links at their one ends bearing against opposite sides of said clamp arm and pivotally connected thereto;

the improvement comprising;

a series of vertically spaced pairs of longitudinally spaced mounting holes extending through rearward portions of said side plates adjacent their tops and bottoms;

and a plurality of opposed additional longitudinally spaced mounting holes extending through forward portions of said side plates adjacent their tops;

apertured spacers interposed between said side plates;

a plurality of pivot bolts extending through some of said side plate mounting holes and spacers interconnecting said side plates;

said side plates upon their interiors having a pair of opposed longitudinally extending guide slots therein;

a rod end between said side plates spaced from said cylinder and axially connected to said piston rod;

a pivot slide pin supportably extending transversely through said rod end and at its ends slidably mounted within said side plate slots, constraining said rod to reciprocal rectilinear movements;

said pair of links at their other ends being pivotally connected to said slide pin;

and an eccentric rotatably adjustable pre-stop on one of said pivot bolts spanning and secured to said side plates in registry with, spaced from and aligned with said clamp arm;

adapted for retaining engagement with said clamp arm when moved to workpiece retaining position, said eccentric pre-stop being rotatably adjustable to eliminate any variation in the clamp arm due to loose linkage and for taking up any wear in order to maintain said clamp arm in a stationary, non-shake position.

2. In the power clamp of claim 1, the mounting of said body upon said first support including an elongated upright riser extending between said side plates and having a series of longitudinal similarly spaced apertures corrsponding to some of said side plate mounting holes and receiving said pivot bolts whereby said body may be mounted in one of a plurality of longitudinal locations relative to said riser, said riser adapted to be selectively projected upwardly and downwardly between said side plates.

3. In the power clamp of claim 2, said riser extending selectively into the top of said body in one of a plurality of positions along the length of said body.

4. In the power clamp of claim 2, said riser extending into the bottom of said body.

5. In the power operated clamp of claim 1, said pre-stop being of cylindrical form and supportably mounted upon one of said pivot bolts, said pre-stop being eccentrically mounted upon said pivot bolt and secured in a predetermined position between said side plates;

said pre-stop pivot bolt on loosening, premitting rotary adjustment of said pre-stop to a different angular position relative to said clamp arm.

6. In the power clamp of claim 1, there being six mounting holes along the top of said body and three mounting holes along the bottom of said body, thereby providing one position of said body when overlying said riser in four positions selectively when said riser extends into the top of said body.

* * * * *